UNITED STATES PATENT OFFICE.

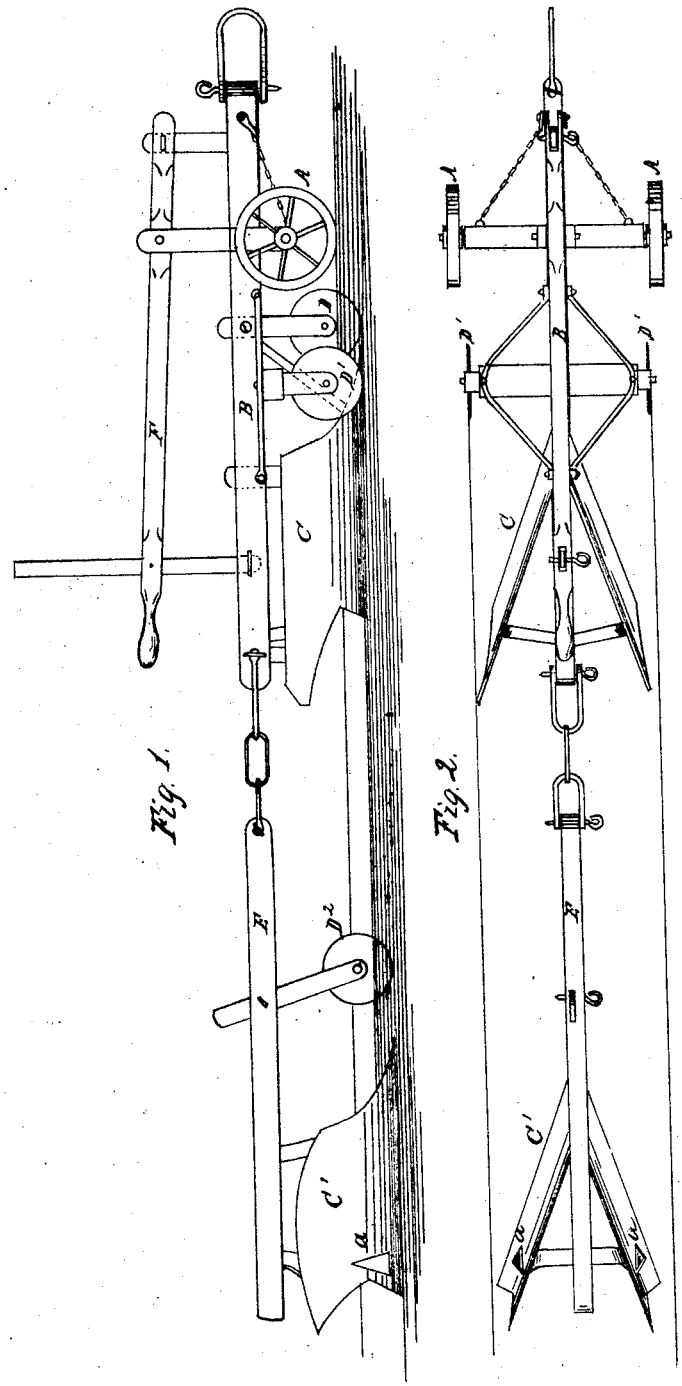

W. A. NICHOLS, OF WEST LIBERTY, IOWA.

IMPROVED DITCHING-MACHINE.

Specification forming part of Letters Patent No. 76,237, dated March 31, 1868.

*To all whom it may concern:*

Be it known that I, W. A. NICHOLS, of West Liberty, in the county of Muscatine and State of Iowa, have invented a new and useful Improvement in Ditching-Machines; and I do hereby declare that the following is a full, clear, and exact description thereof, which will enable those skilled in the art to make and use the same, reference being had to the accompanying drawings, forming part of this specification, in which—

Figure 1 represents a side view of my improved ditching-machine. Fig. 2 is a top view.

Similar letters of reference indicate corresponding parts.

This invention relates to an improvement in a machine for cutting small ditches; and consists in connecting two double mold-board plows, one before the other, the front plow being the largest, and provided with a set of rotary cutting-disks, to open the earth in advance of the plows, and stationary cutters upon the rear plow to slope the banks and pack the earth, the whole being attached to a pair of wheels, to be drawn forward by means of a capstan. By this arrangement of plows and cutters, a clean ditch, sixteen to twenty inches deep, can be cut at one operation, much cheaper than in the ordinary manner with shovels; and thus lands, in the West particularly, may be surface-drained very advantageously.

A pair of wheels, A A, are attached to the forward end of a main plow-beam, B, on the rear end of which is fixed a double mold-board plow, C. In front of this plow are hung to the beam B three circular iron or steel disks, with sharp cutting-edges, one of the disks, D, being placed directly ahead of the breast of the plow, and the others, $D^1 D^1$, being placed in line with the wings of the mold-board, all of which cutters are set as deep as the plow.

Attached to the rear end of the beam B, by link and clevis, is a beam, E, of a smaller-sized double mold-board plow, C′, in front of the breast of which is hung a circular disk, $D^2$, in construction and arrangement similar to those previously described. On each side of the plow C′ sharp-pointed cutters $a$ project upward from the hind part of the share, to shave the sides of the ditch sloping. A lever, F, regulates the depth of the front plow.

To operate the plows, a movable capstan is placed in advance of the plows, connected by a rope with the beam B, and they are drawn forward to cut the ditch at one operation. The front rotary cutter D cuts the earth forward of the breast of the leading plow C, and the cutters $D^1$ cut the earth down in line with the wings of the mold-board, to form smooth sides in the ditch. The rear rotary cutter $D^2$ also cuts the earth in front of the breast of the plow C′ down to the bottom, and the pointed cutters $a$ cut the sides of the ditch sloping. The rear plow runs deeper than the front plow, and, both working together, make a clean ditch, as deep and wide as may be desired, according to the size of the plows employed.

Having described my invention, I claim as new and desire to secure by Letters Patent—

1. The ditching-machine consisting of the forward plow C, attached to the beam B, the cutting-disks $D^1$ in front of said plow, in line with its outer edges, the cutting-disk D, in line with its point, the rear plow C′, having cutters $a$, and secured to the beam E, bearing the cutting-disk $D^2$, and attached to the forward beam by the clevis and link, all constructed and arranged to operate as herein shown and described.

2. The rear plow C′, when provided with the vertical cutters $a$, for shaping the sides of the ditch, as herein shown and described.

3. The arrangement of the forward cutting-disks D $D^1$ with relation to the forward plow C, as described, whereby the earth at the sides and center of the ditch is cut, to enable the plow to throw the dirt equally upon each side, as herein set forth.

W. A. NICHOLS.

Witnesses:
  E. F. HOWELL,
  GEO. P. NICHOLS.